(12) United States Patent
Hill, Jr.

(10) Patent No.: US 8,417,959 B2
(45) Date of Patent: Apr. 9, 2013

(54) BIOMETRIC DEVICE BASED ON LUMINESCENCE

(75) Inventor: Ralph Henry Hill, Jr., San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 882 days.

(21) Appl. No.: 11/612,348

(22) Filed: Dec. 18, 2006

(65) Prior Publication Data

US 2008/0148058 A1 Jun. 19, 2008

(51) Int. Cl.
*G06F 21/00* (2006.01)

(52) U.S. Cl. ........ 713/182; 713/186; 356/213; 356/215; 356/217; 250/485.1

(58) Field of Classification Search ................ 250/485.1; 713/182, 186; 356/213, 215, 217
See application file for complete search history.

(56) References Cited

U.S. PATENT DOCUMENTS

| | | | |
|---|---|---|---|
| 4,794,260 A | 12/1988 | Asano et al. | |
| 4,802,762 A | 2/1989 | Hill, Jr. | |
| 4,852,579 A | 8/1989 | Gilstad et al. | |
| 4,866,283 A | 9/1989 | Hill, Jr. | |
| 5,198,871 A | 3/1993 | Hill, Jr. et al. | |
| 5,515,864 A | 5/1996 | Zuckerman | |
| 5,562,100 A | 10/1996 | Kittrell et al. | |
| 5,737,439 A * | 4/1998 | Lapsley et al. | 382/115 |
| 5,815,598 A | 9/1998 | Hara et al. | |
| 5,892,234 A * | 4/1999 | McKeever et al. | 250/459.1 |
| 6,127,189 A | 10/2000 | Joullié | |
| 6,306,662 B1 | 10/2001 | Manzel | |
| 6,337,918 B1 | 1/2002 | Holehan | |
| 6,586,745 B2 | 7/2003 | Hill, Jr. et al. | |
| 6,668,071 B1 * | 12/2003 | Minkin et al. | 382/124 |
| 6,836,502 B2 | 12/2004 | Canady et al. | |
| 6,914,517 B2 | 7/2005 | Kinsella | |
| 6,914,668 B2 | 7/2005 | Brestel et al. | |
| 6,965,685 B1 | 11/2005 | Smith | |
| 7,620,212 B1 * | 11/2009 | Allen et al. | 382/115 |
| 2003/0037264 A1 * | 2/2003 | Ezaki et al. | 713/202 |
| 2004/0073119 A1 * | 4/2004 | Mycek et al. | 600/476 |
| 2004/0162491 A1 | 8/2004 | Pfister et al. | |
| 2004/0240712 A1 * | 12/2004 | Rowe et al. | 382/124 |
| 2006/0280344 A1 * | 12/2006 | Kee et al. | 382/118 |
| 2007/0239992 A1 * | 10/2007 | White et al. | 713/186 |

FOREIGN PATENT DOCUMENTS

| EP | 0188758 A2 | 12/1985 |
|---|---|---|
| WO | 9006718 | 6/1990 |

OTHER PUBLICATIONS

Hill, Ralph H. Jr.,et al., "Laser-Induced-Fluorescence Inspection of Polyurethane," Proceedings of the 17th Symposium on Nondestructive Evaluation, Apr. 17-20, 1989, San Antonio, TX, 173-186 (16 pages).
Hill, Ralph H. Jr., "Laser-Induced Fluorescence of Space Exposed Polyurethane," Proceedings of the LDEF (Long Duration Exposure Facility) Materials Results of Spacecraft Applications Conference, Huntsville, AL, Oct. 1992 (8 pages).

(Continued)

*Primary Examiner* — Jeffrey Pwu
*Assistant Examiner* — Helai Salehi
(74) *Attorney, Agent, or Firm* — Tucker Grossman et al.

(57) ABSTRACT

The present disclosure relates to an apparatus and/or method of identifying a user comprising illuminating a user with electromagnetic energy to induce luminescence and producing an output data signal. A reference data signal corresponding to the luminescence of a selected user may be identified and compared to the output data signal. In such a manner, an identification may be made as to whether a selected user is present.

21 Claims, 4 Drawing Sheets

OTHER PUBLICATIONS

Hill, Ralph H. Jr., "Laser-Induced Luminescence," Technology Today (published by Southwest Research Institute, San Antonio, TX), 2-7 (Jun. 1989) (6 pages).

Hill, Ralph H. Jr.,et al., "Ultraviolet Fluorescence Imaging Applications," Advanced Technologies for Process Analysis (Journal of Process Analytical Chemistry), Fall 2000, vol. V, Nos. 3,4, pp. 108-114 (7 pages).

Vancaillie, et al., "Laser-Induced Fluorescence of Ectopic Endometriosis in Rabbits," Am. J. Obstet. and Gynecol. vol. 74, No. 2, Aug. 1989, pp. 225-230 (6 pages).

Hill, Ralph H. Jr.,et al., "Quasi-Resonance Enhancement of Laser-Induced-Fluorescence Diagnosis of Endometriosis," Time-Revolved Laser Spectroscopy in Biochemistry II, edited by Joseph R. Lakowitz, Proceedings SPIE 1204, 275-284 (1990) (10 pages).

Hill, Ralph H. Jr.,et al., "A Laser-Induced-Luminescence Technique for Abnormal Tissue," Final Report SwRI Internal Research Project 15-9472, Mar. 1989 (86 pages).

\* cited by examiner

BIOMETRIC DEVICE BASED ON LUMINESCENCE

FIELD OF INVENTION

The present invention relates to a biometric device or method that utilizes luminescence to differentiate biological features. For example, electromagnetic energy of one or more wavelengths may be applied to a substrate such as human tissue to provide a unique output luminescent spectrum and/or unique output luminescent decay pattern that may be analyzed for biometric identification. Such identification capability may then be employed to control user access to a secured device and/or location.

BACKGROUND

Biometrics may be understood as the process of differentiation between people based on intrinsic physical and/or behavioral characteristics. Biometric identification may therefore utilize characteristics such as fingerprints, eye retinas, irises, facial patterns, hand measurement, vocal patterns, signature, gait and typing patterns. These characteristics may be recorded as pieces of data through numerical interpretation allowing for the storage and comparison of data for identification purposes.

Biometric devices may be prone to defeat however, by presenting a non-genuine article to the device that may, for all intensive purposes, mimic the original. For example, with respect to fingerprint scanners, one may present an artificial finger containing a desired fingerprint, which may then be accepted as sufficiently similar to the original because the features forming the fingerprint are similar even though the substrate or tissue which the features are carried on are not the same.

SUMMARY

An aspect of the present disclosure relates to a method of identifying a user comprising illuminating a user with electromagnetic energy to induce luminescence and to produce an output data signal. A reference data signal corresponding to the luminescence of a selected user may be identified and compared to the output data signal. In such a manner, an identification may be made as to whether a selected user is present.

In addition, a further aspect of the present disclosure contemplates illuminating a user with a second electromagnetic energy and forming a second output data signal. A second reference data signal corresponding to a selected user's response to the second electromagnetic energy may be identified. The second reference data signal may be compared to the second output data signal.

Another aspect of the present disclosure relates to a method for selectively providing user access to a secured device or location. The method may include illuminating a user with electromagnetic energy to induce luminescence and to produce an output data signal. A reference data signal corresponding to the luminescence of a selected user may be identified and compared to the output data signal, thereby selectively providing access to the secured device or location.

A further aspect of the present disclosure relates to an apparatus for identification, which may include a processor and a memory, at least one excitation source capable of illuminating a user with electromagnetic energy to produce luminescence, and a detector capable of detecting the luminescence and providing an output signal to the processor wherein the processor is capable of analyzing the signal and identifying a user.

BRIEF DESCRIPTION OF THE DRAWINGS

The detailed description below may be better understood with reference to the accompanying figures which are provided for illustrative purposes and are not to be considered as limiting any aspect of the invention.

DETAILED DESCRIPTION

Figure 1:
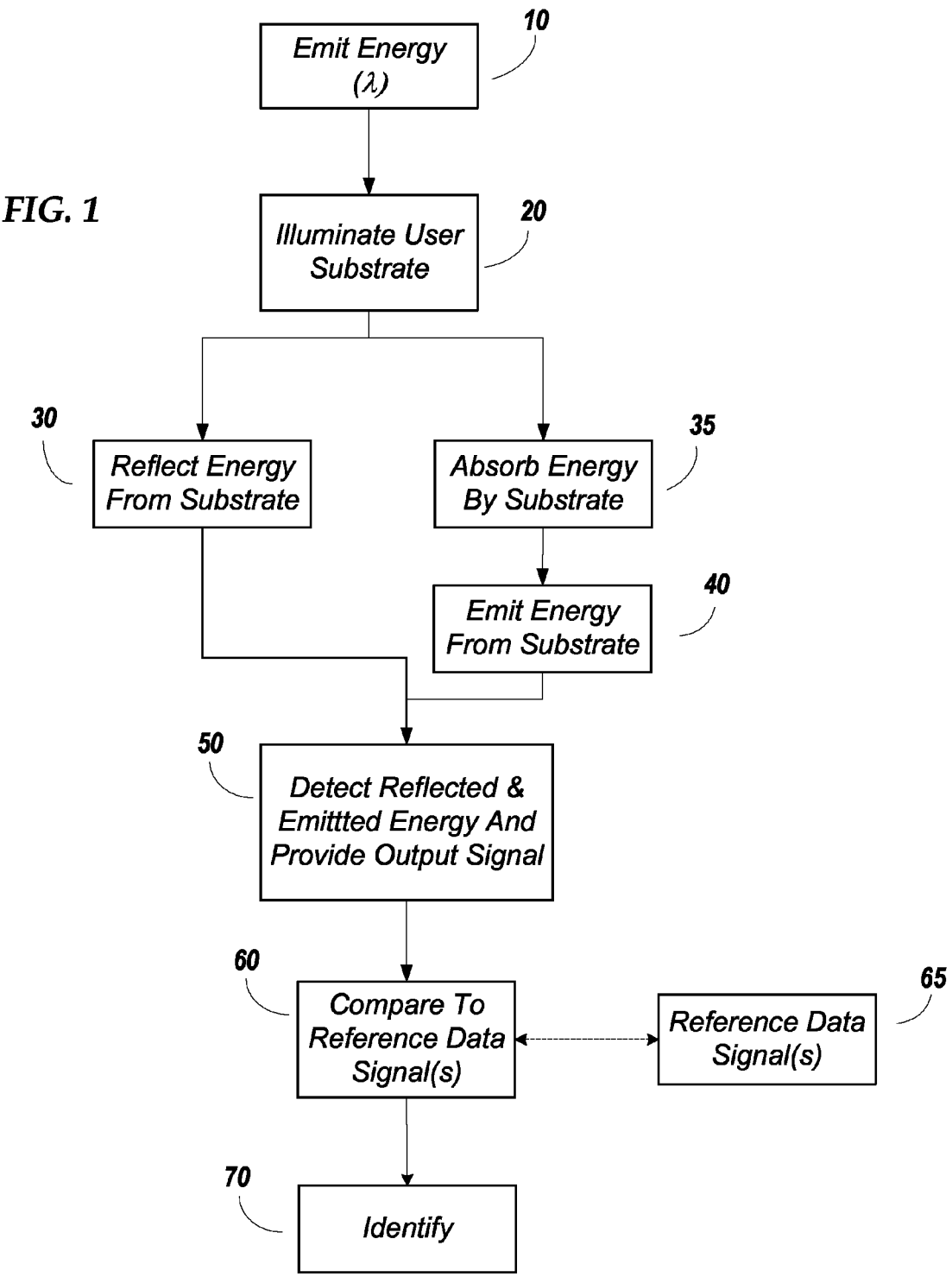
FIG. 1 is a schematic of an exemplary method of identifying a user employing an optical biometric device.

The present invention relates to a method and/or biometric device that may be used to detect biometric information utilizing luminescent electromagnetic energy reflected and emitted from a substrate presented for identification. The substrate may be tissue, such as a finger, eye, face or other biological information that may be presented for identification. A biometric device may be understood as any device capable of detecting an intrinsic physical or behavioral feature, such as fingerprints, iris patterns, retinal patterns, facial features, hand measurements, vocal patterns, typing patterns, etc.

The method and/or biometric device herein may be used to selectively provide a user access to, e.g., a secured device or location. It may be understood that selectively providing access includes approving or denying access. It should also be understood that a secured device is any device where it may be useful to restrict access to one or more selected users. For example, a computer device, such as a personal laptop computer, a handheld device such as a cell phone or even personal digital assistant (PDA). It is also contemplated herein that the method and/or device herein may be used to restrict access to a selected location for security purposes, such as selectively providing access to a selected area of a building, a selected area of a commercial airliner or any other region where security may be desired.

In an exemplary embodiment, the device or apparatus herein may be an optical device, however, other devices may be used with such optical device, such as thermal devices, capacitive devices, E-field or linear field technology, etc. An optical biometric device may utilize one or more electromagnetic energy excitation sources. An electromagnetic excitation source may be understood as a source that provides energy transmitted through space or matter in the form of electromagnetic waves. Such source may include an LED or a laser. A LED (light emitting diode) may be understood as a semiconductor diode that includes a p-n junction, which may emit narrow-spectrum light when electrically biased in the forward direction. The LED may provide an excitation generating electromagnetic energy in the range of 200 to 1500 nm, including all values and increments therein, such as 380 nm, 450 nm to 470 nm, etc. A laser (light amplification by stimulated emission of radiation) may be understood as an optical source that may emit photons in a coherent beam and may also have a relatively narrow-spectrum bandwidth. The laser may be a solid state laser, such as a doubled neodymium doped yttrium aluminum garnet (Nd:YAG) laser, which may produce a wavelength of approximately 532 nm, however, other laser sources may be contemplated as well such as gas lasers including helium-neon or argon-ion, or laser diodes. Lasers may provide an excitation generating electromagnetic energy in the range of about 150 to over 3,000 nm, including all values and increments therein, such as 532 nm, 193-351 nm, etc. As alluded to above, however, other optical sources, or excitation sources may be utilized as well.

As illustrated in FIG. 1, electromagnetic energy may be emitted from the excitation source 10. The electromagnetic energy may be in the form of waves at a given wavelength ($\lambda$). The electromagnetic energy may also specifically have at least a first wavelength $\lambda_1$ in a first electromagnetic region and a second wavelength $\lambda_2$ in a second electromagnetic region where $\lambda_1 \neq \lambda_2$. It should be appreciated that any plurality of wavelengths may be used, i.e two or more wavelengths. It should also be appreciated that a single wavelength may be within a given range of wavelengths, such as a within 1 to 40 nm of a desired wavelength.

The electromagnetic regions may be understood herein as regions of wavelengths, such as visible light, which may have wavelengths of about 390 nm to about 780 nm; infrared (IR) light, which may have wavelengths of about 750 nm to about 1 mm; ultraviolet (UV) light, which may have wavelengths of about 1 nm to about 400 nm, etc. It should be appreciated that $\lambda_1$ and $\lambda_2$ may be within the same or different regions. For example, in one embodiment, $\lambda_1$ may be within the region of visible light and $\lambda_2$ may be within the electromagnetic region associated with ultraviolet light. In another embodiment the first and second electromagnetic regions may be in that of visible light.

The electromagnetic energy may be illuminated onto tissue such as a finger or another substrate (retina, iris, etc.) 20 of a user. A portion of the electromagnetic energy may then be reflected to instrumentation 30, which may detect the reflected energy 50 and detect the intensity of the energy. Intensity may be quantified by a number of measurements, such as Watts, Watts per square meter, lux, lumens, etc. For example, lux may be understood as a unit of illuminance or the density of light that may fall on a surface taking into account the area over which the luminous flux may be spread. Lumens may be understood as the output from a light source, regardless of the area over which the light may be spread.

Electromagnetic energy from the excitation source may also lead to luminescence wherein the molecular absorption of photons by the substrate may trigger the emission of another photon that may be at longer or different wavelengths having varying degrees of intensity. Luminescence may generally refer to and include both fluorescent and phosphorescent effects. Fluorescence may be understood as relatively fast luminescence, exhibiting decay on the order of nanoseconds to microseconds. Phosphorescence may be understood as luminescence exhibiting a relatively longer emission of the electromagnetic energy. Accordingly, referring back to FIG. 1, some of the electromagnetic energy may be absorbed 35 and emitted 40 from the substrate at new and different wavelengths which may be dependent on the molecular structure of the substrate. Detector 50 may include a filter and may therefore detect reflected and emitted energy.

The luminescence may have a relatively unique spectrum for a given material depending upon the excitation source wavelength. Such spectrum may therefore amount to a plot of luminescence intensity (arbitrary units) versus wavelength. In addition, it may be appreciated that one may identify decay in luminescent intensity versus time. Accordingly, luminescence may be indicative of material characteristics that may not otherwise be visible utilizing the visible light spectrum. Both the luminescent emission intensity at various wavelengths and duration (or decay) of the emission may therefore be utilized to selectively characterize the luminescence of the tissue at a given excitation energy (wavelength) or spectrum (range of wavelengths).

The detection instrumentation may include one or more devices for detecting the various wavelengths or forms electromagnetic energy, such as a photodetector. Photodetectors may include photodiodes or charge coupled devices. A photodiode may be understood as a semiconductor including a p-n junction. When electromagnetic energy of a given wavelength range strikes the photodiode, photons may be absorbed resulting in the production of a photocurrent. The photodiode may be silicon based and may be sensitive to wavelengths in the range of 190 to 1100 nm, including all values and increments therein. A charge coupled device (CCD) may be understood as an image sensor including an integrated circuit containing an array of linked or coupled capacitors or photodiodes sensitive to electromagnetic energy. CCD's may also be sensitive to wavelengths in the range of 150 to 1100 nm, including all values and increments therein.

A processor may also be provided at 60 which may receive the output signal from detector 50. The processor may filter the detected energy or otherwise manipulate the detected energy, such as by analog to digital conversion, amplification, etc., and convert the information into a digital or numerical representation of the detected electromagnetic energy. As noted above, the processor may therefore provide a plot of luminescent intensity (arbitrary units) versus wavelength and/or a plot of decay in luminescent intensity versus time. In addition, the processor may be configured to sample the data using various techniques such as sampling at the full width at half maximum (FWHM) or other parameters.

A memory 65 (which may be part of the processor or positioned remotely) may store a collection of one or more reference data signals containing plots of luminescent intensity versus wavelength and/or decay in luminescent intensity versus time for selected (known) users. A comparison of the reference data signals and output data signals may then be made to identify whether a selected user is present. For example, a selected user may be identified under circumstances where a match may be observed between the location of maximum observed luminescent intensity at a certain wavelength and/or match between luminescent decay times.

In addition, the processor may be programmed to compare and identify a certain number of overlapping data points as between the above described luminescent plots. Upon comparison, differences between the presented substrate and the stored composite data may be detected and assessed to determine the degree of error between the user substrate and the reference data signals. If the error is within a given limit, a user may be verified as a selected (approved) user. If the error is outside of a given limit, the user may be identified as unapproved. The processing may be performed by hardware, software or firmware. In addition, the processor may be capable of learning, that is, as the biometric information changes over time, (i.e. freckles appearing in irises, retinas changing due to pressure, etc.,) the processor may adjust the reference data based on these changes. It should be appreciated that the image processor which may be operating at 60 may be integrated into the detector and may also be a stand alone device.

Figures 2A, 2B:
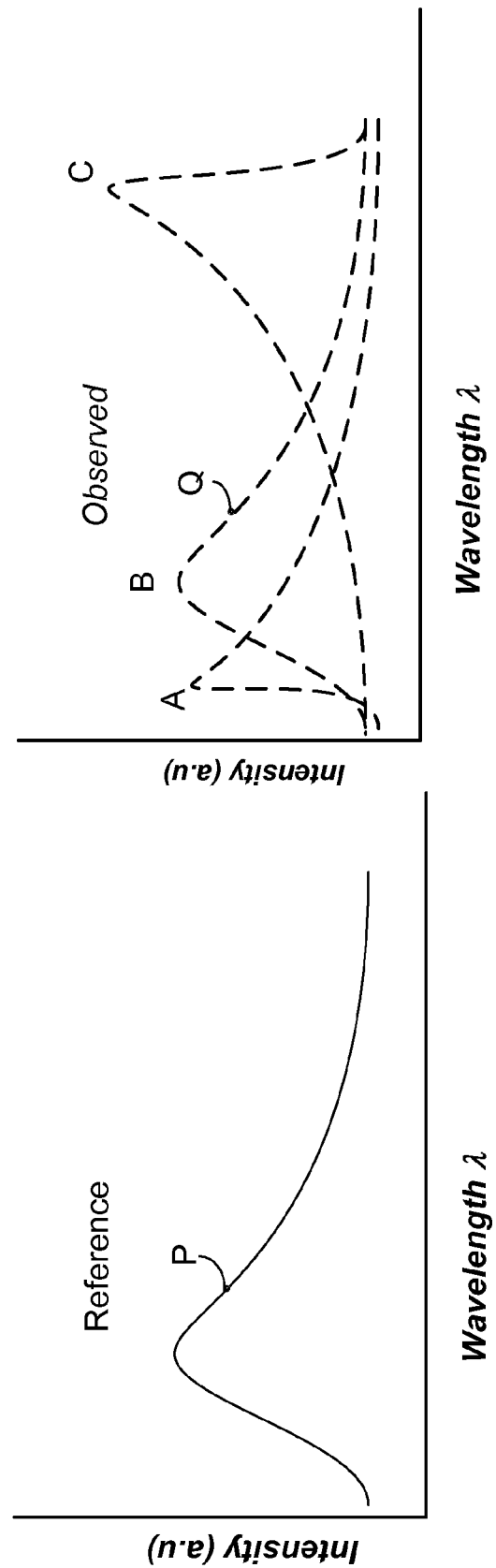
FIGS. 2A and B illustrate an exemplary reference data signal (2A) and various output data signals that may be induced by various random users (2B).
Figure 3B:
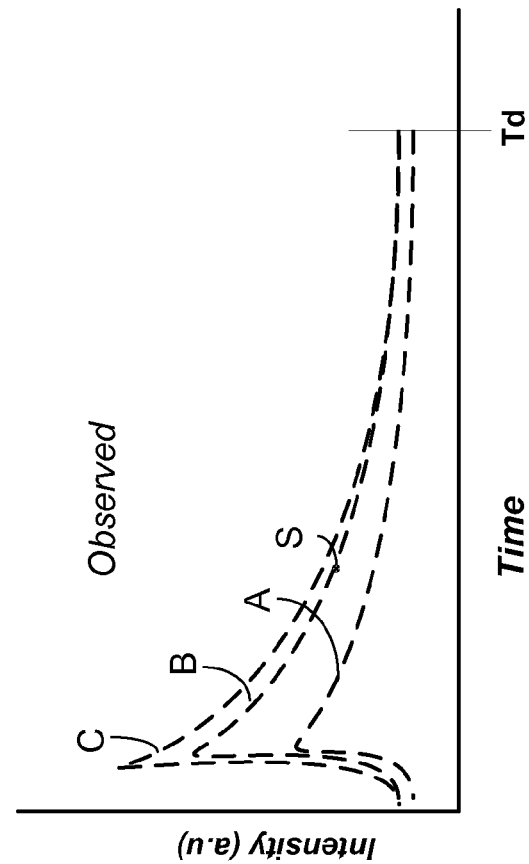
FIGS. 3A and B illustrate an exemplary reference data signal (3A) and various output data signals that may be induced by various random users (3B).
Figure 3A:
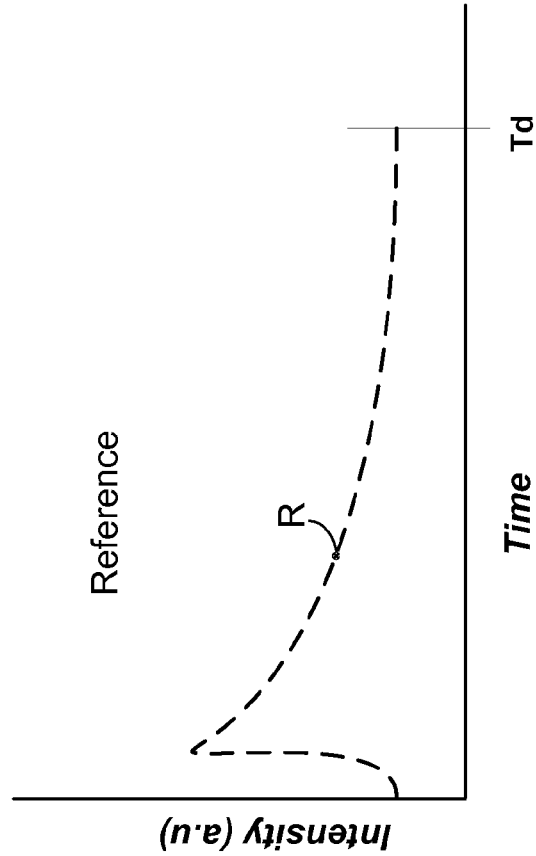

By way of example, reference is made to FIG. 2A, which illustrates a reference data signal corresponding to luminescent intensity versus wavelength of a selected user subsequent to exposure to electromagnetic energy of a given wavelength. FIG. 2B illustrates an output data signal of random users A, B and C. As can be seen in FIG. 2B, output data signal of random user B provides a relatively similar output data signal to the reference data signal of FIG. 2A, and under those circumstances, a selected user may be identified. In addition, reference is made to FIG. 3A, which illustrates a reference data signal corresponding to luminescent decay time of a selected user after exposure to electromagnetic energy of a given wavelength. FIG. 3B illustrates an output data signal of random users A, B and C in terms of luminescent decay time. As can be seen in FIG. 3B, output data signal of random user B provides a relatively similar output data signal to the reference data signal of FIG. 3A, and under those circumstances, a selected user may be identified.

Prior to reaching the detector, the reflected and emitted electromagnetic energy may be filtered using one or more filters. Exemplary filters may include short pass filters, which may attenuate longer wavelengths, long pass filters, which may attenuate shorter wavelengths and transmits longer wavelengths, or band filters which may allow required ranges to pass through selectively. Such filters may include RG570 filters (available from Schott of Elmsford, N.Y.). In an exemplary embodiment, the filter may be utilized to block electromagnetic energies of one or more given wavelengths or wavelength ranges. For example, the filter may be utilized to block out electromagnetic energy reflected or emitted from the substrate having a selected wavelength and allow electromagnetic energy of one or more different wavelengths to pass through.

In addition, lenses and other devices may be utilized prior to or after illumination of the substrate to focus or otherwise alter the electromagnetic energy. For example, the lenses may be used to focus the electromagnetic energy or to diverge the electromagnetic energy.

Furthermore, where more than one excitation source may be contemplated, a multiplexer, such as a wavelength-division multiplexer, may be utilized to allow for more than one excitation source to be included along a single optical path. The multiplexer may be utilized at the excitation source to combine or join electromagnetic energy of various frequencies together and then a demultiplexer may be utilized at the detecting instrumentation to split the frequencies back into individual components.

Figure 4:
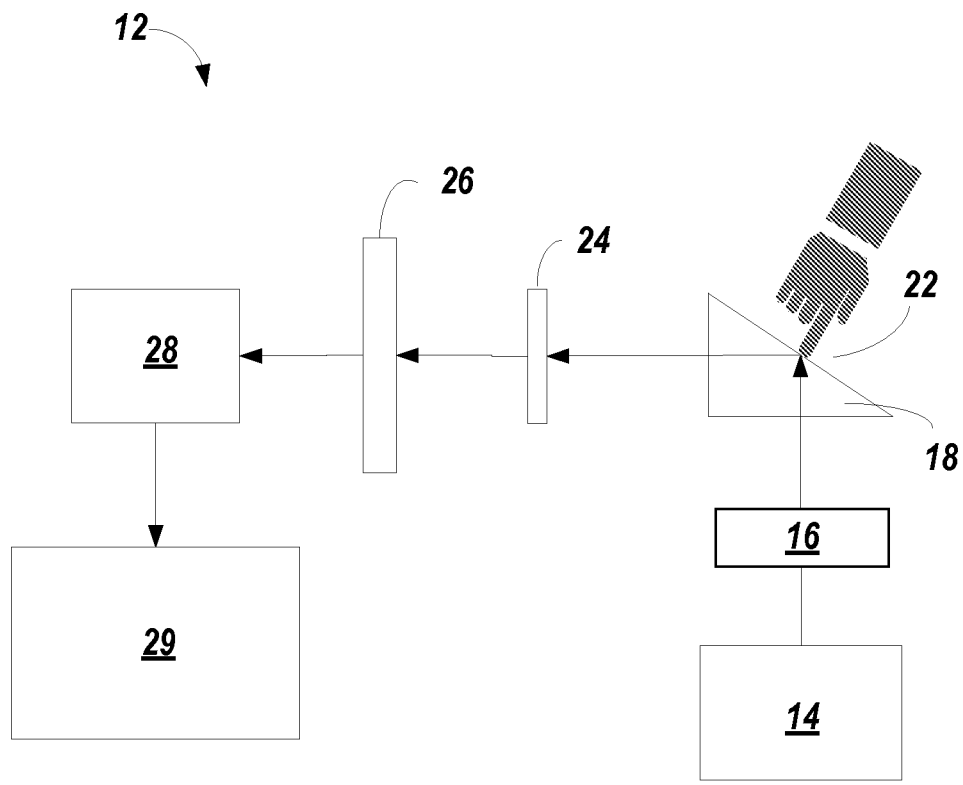
FIG. 4 is a schematic of an exemplary embodiment of an exemplary optical system for biometric identification.

In another exemplary embodiment, illustrated in FIG. 4, an apparatus 12 may include one or more excitation sources 14. Energy of a given wavelength, or wavelengths from the excitation source may be modulated (e.g., sine wave modulation) or passed through a shutter 16, particularly if the excitation source is a laser source. The energy may then pass through an interface 18 upon which a substrate may be placed or moved over. The substrate 22 (e.g. a user's finger) may be illuminated by the electromagnetic energy of one or more wavelengths from the excitation source 14 passing through the interface 18. Interface 18 may focus and direct the electromagnetic energy to the substrate. The electromagnetic energy may then be reflected, scattered, or absorbed and at least partially emitted by the substrate back through interface 18 or through another interface. Once exiting the interface 18, the light may optionally be passed through a filter 24 and/or a lens 26 arriving at the detector 28 where it may be sensed and processed. A processor 29 may then read and analyze the detected output signals. For example, the intensity, wavelength, time decay, phase shifts, etc., of a given output signal or signals may be detected, measured and compared to a number of reference signals.

The processor may then compare such plot to corresponding plots stored in memory to identify whether a selected user is present. In such a manner, referring back to FIGS. 2A/B and FIGS. 3A/B, the processor may select one or more "x-y" points, identified as locations P, Q, R or S along the reference curves and the output data for comparison. For example, with respect to FIGS. 2A/B, a match may be indicated under those circumstances where point P and point Q are within +/−5 units of intensity (arbitrary units) and +/−10 nm in wavelength. With respect to FIGS. 3A/B a match may be indicated under those circumstances where point R and point Q are within +/−5 units of intensity (arbitrary units) and +/−10 nanoseconds, including all values of intensity or time and ranges therein. In addition, a match may be indicated under those circumstances where the total decay time (Td) is within +/−10 nanoseconds, including all values and ranges therein. It should be appreciated that this discussion of the circumstances that may indicate a match may be used either individually or in combination.

It may also be appreciated that the apparatus herein may discriminate between real tissue, such as a finger, which may produce luminescence having a given wavelength and decay, and an imposter, such as a replica of the real tissue or dead tissue, which may produce luminescence having another given wavelength and decay. Such discrimination may therefore operate when the traditional fingerprint patterns would otherwise suggest a match.

Accordingly, it should be appreciated from the above that the present disclosure contemplates a method and apparatus for illuminating a user with electromagnetic energy to induce luminescence and produce an output data signal based on the induced luminescence. A reference data signal corresponding to the luminescence of a selected user may be identified and the reference data signal may be compared with the output data signal to identify whether a selected user is present or to provide access to a secured device or location.

In addition, as noted above, the present disclosure also contemplates illuminating a user with a second electromagnetic energy and forming a second output data signal. A second reference data signal corresponding to a selected user's response to the second electromagnetic energy may be identified. Such response may include reflected and/or emitted electromagnetic energy. The second reference data signal may then be compared to the second output data signal. It may therefore be appreciated that one may also multiplex or combine a first and second output data signal to provide a unique user signature which may be compared to combined or multiplexed reference data signals and comparisons and identification of a user may be provided.

The foregoing description is provided to illustrate and explain the present invention. However, the description hereinabove should not be considered to limit the scope of the invention set forth in the claims appended here to.

What is claimed is:

1. A method of identifying a user comprising:
   illuminating a user with first electromagnetic energy having a first wavelength provided by an excitation source to induce luminescence, wherein a portion of said first electromagnetic energy is absorbed and emitted from the user at a different wavelength;
   illuminating said user with a second electromagnetic energy provided by said excitation source;
   detecting said luminescence with a detector and producing a first output;
   detecting a portion of said second electromagnetic energy reflected by said user and forming a second output;

identifying a first reference corresponding to said luminescence of a selected user stored in memory;
identifying a second reference corresponding to said selected user's response to said second electromagnetic energy stored in memory;
comparing by a processor said first reference to said first output;
comparing by said processor said second reference to said second output;
identifying whether a selected user is present; and
adjusting said first and second reference stored in memory based on changes over time in said luminescence and said second electromagnetic energy reflected by said user wherein said changes correspond to changes in said user's biometric information regarding a physical feature of said user.

2. The method of claim 1 including combining said first and second output.

3. The method of claim 1 wherein said luminescence of a user comprises luminescence of tissue.

4. The method of claim 1 where said illumination of said user comprises illuminating tissue.

5. The method of claim 1 wherein said first electromagnetic energy comprises wavelengths of about 1-400 nanometers.

6. The method of claim 1 wherein said luminescence comprises wavelengths of about 390-780 nanometers.

7. The method of claim 1 wherein said first and second electromagnetic energy is sourced from an LED or a laser.

8. The method of claim 1 wherein said first electromagnetic energy comprises a first wavelength $\lambda_1$ and said second electromagnetic energy comprises a second wavelength $\lambda_2$ wherein $\lambda_1 \neq \lambda_2$.

9. The method of claim 1 wherein said first reference comprises data corresponding to luminescence intensity versus wavelength and said first output comprises data corresponding to luminescence intensity versus wavelength.

10. The method of claim 1 wherein said first reference comprises data corresponding to decay in luminescence intensity versus time and said first output comprises data corresponding to decay in luminescence intensity versus time.

11. The method of claim 1, wherein said given physical or behavioral feature includes one or more features selected from the following: fingerprints, iris patterns, retinal patterns, facial features, hand measurements, and vocal patterns.

12. The method of claim 2 including combining said first and second reference.

13. The method of claim 9 wherein said comparing of said first reference to said first output comprises identifying the presence or absence of a match in luminescence intensity at a selected wavelength.

14. The method of claim 10 wherein said comparing of said first reference and said first output comprises identifying a match in total decay time (Td).

15. The method of claim 10 wherein said comparing said first reference and said first output comprises identifying a match by sampling at full width at half maximum.

16. The method of claim 12 including comparing said combined first and second output to said combined first and second reference.

17. A method for selectively providing user access to a secured device or location comprising:

illuminating a user with first electromagnetic energy having a first wavelength provided by an excitation source to induce luminescence, wherein a portion of said first electromagnetic energy is absorbed and emitted from the user at a different wavelength;
illuminating said user with second electromagnetic energy provided by said excitation source;
detecting said luminescence with a detector and producing a first output from a detector;
detecting a portion of said second electromagnetic energy reflected by said user and forming a second output;
identifying a first reference corresponding to luminescence of a selected user stored in memory;
identifying a second reference corresponding to said selected user's response to said second electromagnetic energy stored in memory;
comparing by a processor said first reference to said first output;
comparing by said processor said second reference to said second output;
selectively providing access to said secured device or location; and
adjusting said first and second reference stored in memory based on changes over time in said luminescence and said second electromagnetic energy reflected by said user wherein said changes correspond to changes in said user's biometric information regarding a physical feature of said user.

18. The method of claim 17 wherein said first electromagnetic energy comprises a first wavelength $\lambda_1$ and a second electromagnetic energy comprises a second wavelength $\lambda_2$ wherein $\lambda_1 \neq \lambda_2$.

19. The method of claim 17 wherein said secured device comprises a computer.

20. An apparatus for identification comprising:
a processor and a memory;
at least one excitation source capable of illuminating a user with first electromagnetic energy having a first wavelength selected to produce luminescence, wherein a portion of said first electromagnetic energy is absorbed and emitted from the user at a different wavelength;
at least one excitation source capable of illuminating said user with second electromagnetic energy selected to be reflected by said user;
a detector capable of detecting said luminescence at said different wavelength and detecting a portion of said second electromagnetic energy reflected by said user and providing an output to said processor wherein said processor is capable of analyzing said output, identifying a user by comparing said output to reference data stored in memory and adjusting reference data stored in memory based on changes over time in said luminescence and said second electromagnetic energy reflected by said user wherein said changes correspond to changes in said user's biometric information regarding a physical feature of said user.

21. The apparatus of claim 20 wherein said excitation source is capable of illuminating said user with said first electromagnetic energy at first wavelength $\lambda_1$ and said second electromagnetic energy at a second wavelength $\lambda_2$ wherein $\lambda_1 \neq \lambda_2$.

* * * * *